United States Patent [19]
Martin

[11] Patent Number: 5,574,576
[45] Date of Patent: Nov. 12, 1996

[54] COHERENT LIGHT DRIVEN DISPLAY DEVICE

[76] Inventor: Danny W. Martin, 3704 Calle Castano N.E., Albuquerque, N.M. 87111

[21] Appl. No.: 65,855

[22] Filed: May 21, 1993

[51] Int. Cl.$^6$ .................. H04N 1/195; G09B 21/00; H04B 3/36; H04B 10/12; H04B 10/16
[52] U.S. Cl. .................. 358/484; 434/114; 345/31; 345/84; 348/62; 340/825.19; 340/407.2; 359/173; 359/179
[58] Field of Search .................. 434/113, 114; 345/31, 85, 108, 109; 348/62, 63; 359/174, 179, 173; 340/407.1, 407.2, 825.19; 341/21; 358/484

[56] References Cited

U.S. PATENT DOCUMENTS

| | | | |
|---|---|---|---|
| 3,229,387 | 1/1966 | Linvill | 434/114 |
| 3,562,408 | 2/1971 | Collins et al. | |
| 3,594,787 | 7/1971 | Irkes | 340/407.1 |
| 3,770,966 | 11/1973 | Sagawa et al. | 359/179 |
| 4,033,053 | 7/1977 | Engler | |
| 4,215,490 | 8/1980 | Fewell | |
| 4,266,936 | 5/1981 | Rose et al. | 434/114 |
| 4,283,178 | 8/1981 | Tetzlaff | 434/114 |
| 4,295,225 | 10/1981 | Pan | 359/179 |
| 4,500,293 | 2/1985 | Eltgen | 434/114 |
| 4,501,022 | 2/1985 | Oswald | 359/174 |
| 4,637,071 | 1/1987 | Pitt et al. | 359/173 |
| 4,972,501 | 11/1990 | Horyu | |
| 5,088,803 | 2/1992 | Buzawa | |
| 5,165,897 | 11/1992 | Johnson | 434/113 |

*Primary Examiner*—Scott A. Rogers
*Attorney, Agent, or Firm*—Haverstock, Garrett and Roberts

[57] ABSTRACT

An optical display device to allow a person or a device to physically sense various images. The device includes an image sensor having at least one image input portion adapted to be directed at a scene in which images are to be viewed, a circuit optically coupled to the image sensor to convert the images viewed by the input portion into amplified coherent light energy beam, and a photosensitive display device in optical communication with the coherent light energy beam for producing a physically recognizable display of the viewed scene.

13 Claims, 3 Drawing Sheets

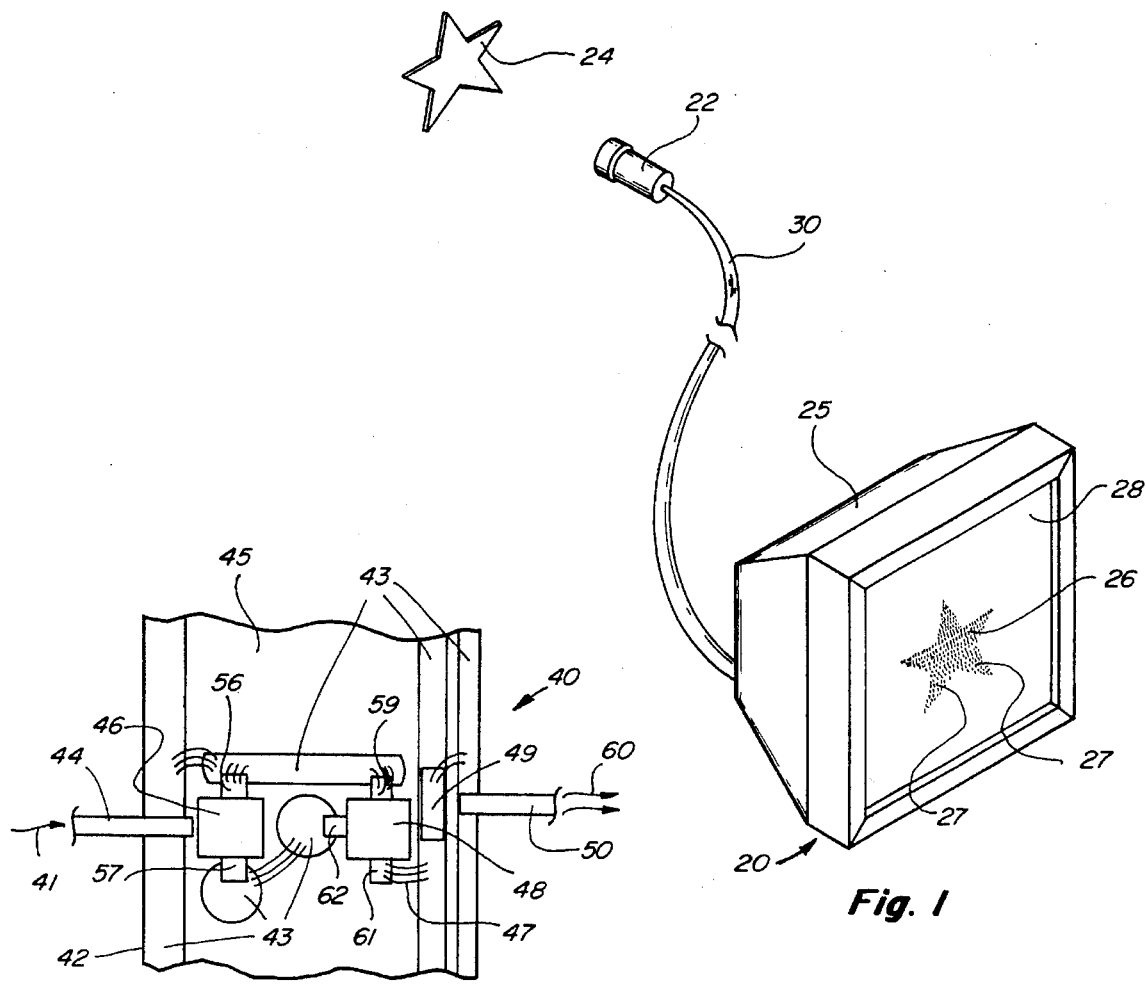
Fig. 3
Fig. 1
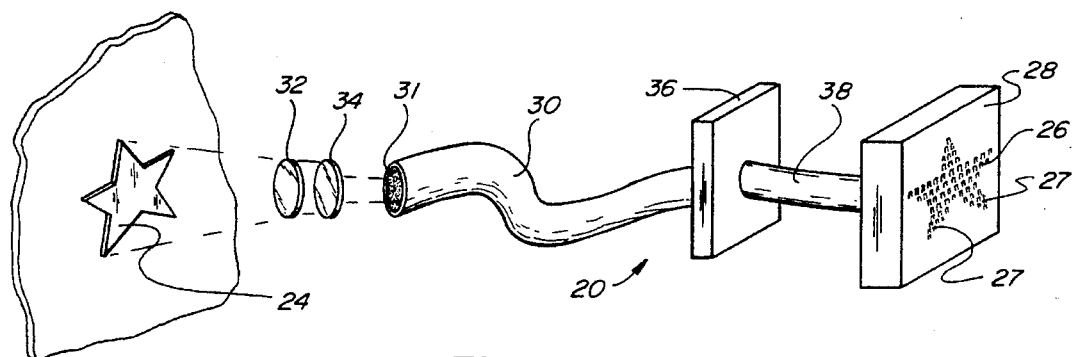
Fig. 2

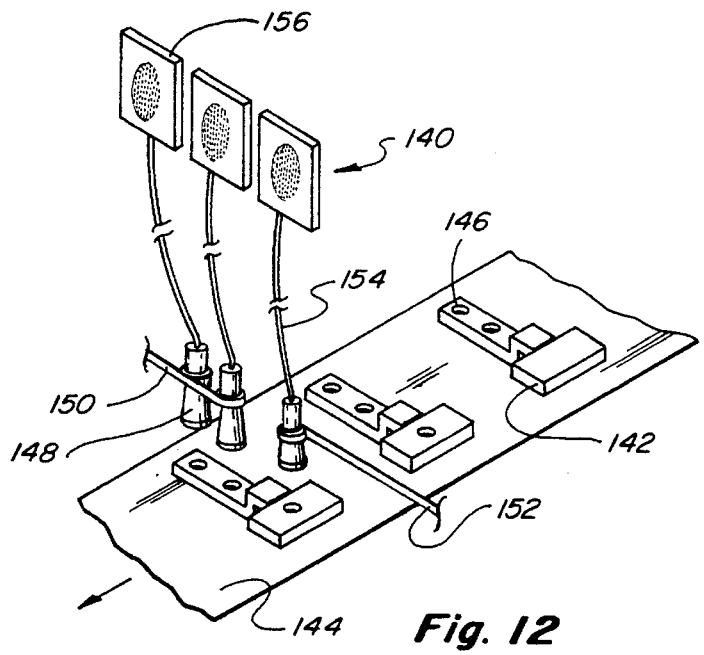
Fig. 12
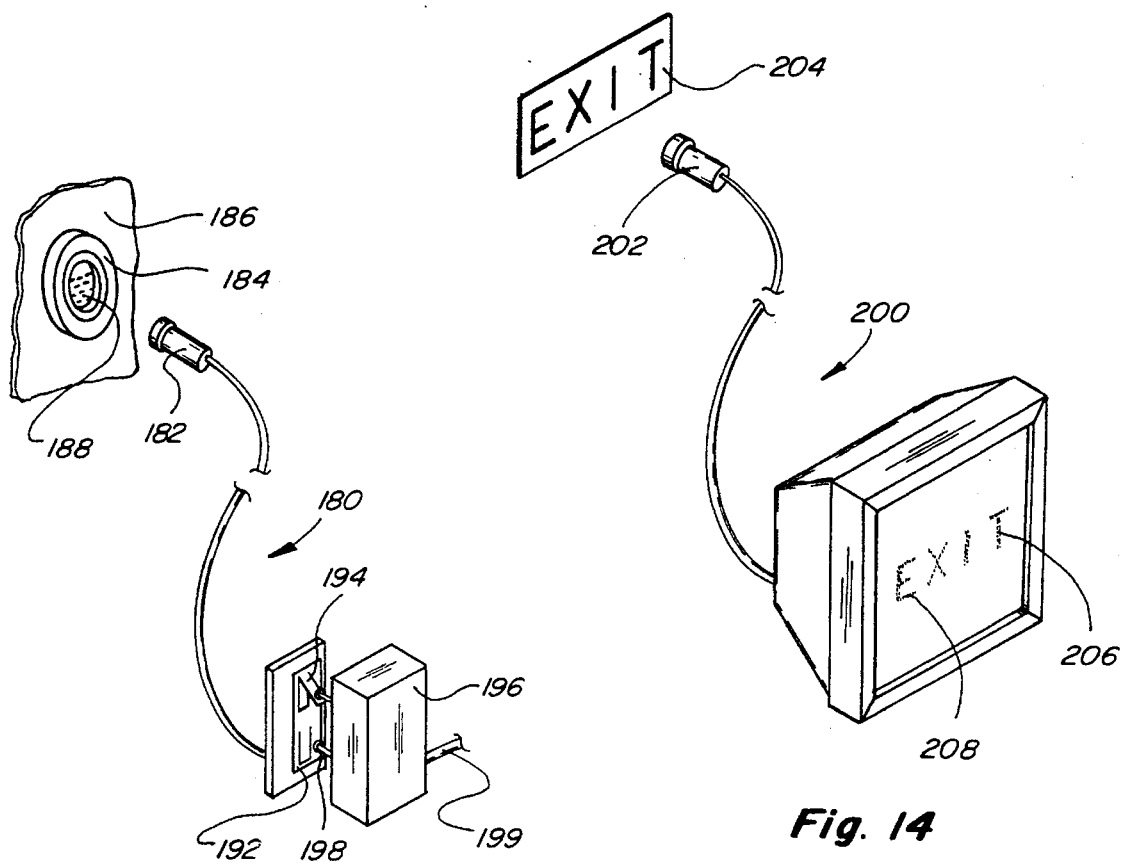
Fig. 13
Fig. 14

COHERENT LIGHT DRIVEN DISPLAY DEVICE

FIELD OF THE INVENTION

The invention relates to a mechanical device for displaying representations of images, and more particularly, to an optical display device for forming representations of images on a photosensitive display.

BACKGROUND OF THE INVENTION

There are many circumstances in industry and elsewhere where remote sensing of objects and locations is desired for some reason. Optical sensing for monitoring and other purposes of remote locations has for the most part relied on visual observation, sometimes with the aid of magnifying optical instruments or by using video cameras for display on monitors and like devices. Although the size of such video electronic equipment has over time been reduced, overall such devices still are relatively bulky and inappropriate for many applications and do not provide means for distinguishing between objects of different colors or intensities except possibly by visual observation. No one device known so far has provided sense images for the purpose of producing an image that can be made to be otherwise sensed such as by feel. Fiber optic means are an efficient means of remotely communicating such optically sensed images and information and can be combined with means for forming a tactile or other representation of such images and information.

The present invention also lends itself to helping visually impaired people face the difficult challenge of recognizing remote images in their surrounding environment. Although they can and to utilize external guide mechanisms such as seeing eye dogs and canes which help them to avoid hazards, there still are times when undetected hazards put them at risk. Also, published and other types of information not in the Braille format cannot be comprehended by those with such visual impairment. Therefore, an optical display device which enables one to rapidly experience their surroundings in a tangible manner without coming in direct contact with surrounding objects can be an important instrument.

Several different forms of optical devices for producing a physical representation of a visual image have been designed in the past. The reading aid disclosed in U.S. Pat. No. 3,229,387 displays visual images in a vibrating physical display. Visual images are focused through a lens or through fiber optic means onto a system of photoconductive cells which produces and applies an unamplified current to a plurality of piezoelectric reeds. These reeds vibrate when activated to form the vibrating display. The visual substitution system disclosed in U.S. Pat. No. 3,562,408 incorporates a photomultiplier tube with a photocathode, an image intensifier and an anode display array which imparts a current representing the images directly into the skin of the wearer. An electrical optical scene scanner is disclosed in U.S. Pat. No. 3,594,787 which focuses images onto a photosensitive cell and displays an amplified electrical signal to individual display elements to provide a raised surface representing the observed image. None of these inventions convert the received incoming images into amplified laser light signals which in turn are used to produce representative physical images on a light sensitive display device.

The present invention is directed to a device which can convert incoming visual and other signals observed by sensing means into physical, tactile displays. Importantly unlike the prior art devices, the present apparatus converts incoming images into corresponding light energy signals such as in the form of amplified laser light signals, which energy signals are directed to light sensitive elements in a device that produces tactile displays. When the optical display device is used, the image input portion of the apparatus is directed towards the object or objects of interest and the input energy signals produced are converted thereby into amplified laser light signals by circuits comprising in part photosensitive means and laser diodes. The device includes a plurality of conversion and amplification circuits corresponding in number with the number of individual signal transmitting means, and with the corresponding number of display elements in the display device. The resulting amplified laser light signals are optically transmitted through fibers in a coherent optical bundle of fibers towards individual movable elements formed in an array on the photosensitive display device. A coherent fiber optic bundle is a bundle wherein each of the fibers are physically in the same position or location in the bundle, including the position at both opposite ends of the fiber bundle, so the portions of the viewed image transmitted by the individual fibers are in an identical arrangement or orientation when the image enters and exits the fiber bundle. The display elements may be treated with an optically absorbant coating which responds to the incoming laser light energy by causing an element displacement sufficient to form a tactile or three dimensional representation of the observed images. This invention enables one to physically detect objects in the field of view and to communicate such information that otherwise would not normally be able to be seen or sensed in certain situations. The device can be useful as an aid to the blind and also for use in certain manufacturing processes and other fields where analysis of observed information is required and where remote information gathering even on a continuous basis is required.

SUMMARY OF THE INVENTION

The present invention relates generally to a sensory apparatus which allows a person or a device to physically sense images from the visible as well as from the infrared and ultraviolet spectrum, and particularly to an apparatus or device which incorporates photo-activation of a display for tactile representation of such images. In its preferred optical embodiment, the present optical display device is comprised of an image input portion, a means for converting the images produced by the input portion into amplified coherent light energy, and a photosensitive tactile display unit for producing a physically recognizable display of the coherent light energy. The sensory input portion comprising focusing lenses and associated transmission fibers, is directed to and focused on an item or location of interest and receives incoming input information therefrom. These sensory signals are fed through optical means into signal conversion means which include a plurality of circuits, each circuit containing in part a photosensitive device such as a phototransistor, a transistor and a laser diode, to amplify and convert the individual components of the input sensory signals into corresponding amplified laser light signals. Where the input involves a complex combination of signals, such as parts of a visual image or scene, the sensory input portion of the invention separates the input into a plurality of individual components representative of different distinct portions of the scene or image prior to transmission to a corresponding number of respective individual conversion circuits. The circuits may be biased so as to produce laser light signals with an amplified linear response of greater intensity than the intensity of the corresponding incoming visual signals. The coherent laser light signals produced therewith are then transmitted through other respective optical means to activate corresponding photosensitive elements in the display unit. The elements of the display may be coated with a light absorbing treatment that absorbs the light energy from the laser light signals and heats up, thereby causing a distortional displacement such as from the normal plane of the display and in so doing forms a physical three dimensional representation of the observed image. The three dimensional representation is detectable in some way such as through a mechanical sensor, electrical switch, mechanical switch or through one's sense of touch. The displacement of the various elements may also be made proportional to the strength of the incoming signals. The preferred sensitivity and definition for the intended application to produce a sufficient tactile representation of the observed image for recognition by a device or by a person feeling the display can be controlled by the number, size and arrangement of the elements in the tactile display. The sensitivity can also be controlled by the bias applied to the laser diode circuit, thus making the system even more light sensitive.

The components of the present device can be incorporated into a device which produces an ever changing real time display of the visual input. Such a display also lends itself to being recorded for permanent information retention. Alternatively the display can incorporate means for temporarily retaining the elements in a fixed form to be subsequently released and returned to their non-activated positions.

The ability to increase the amplification of the sensory input produced by the present invention enables it to generate a physical representation that can be represented in a physical form and can be sensed as by feeling the representation. Although the device is designed to sense objects and images in real time, it also can be utilized by the visually impaired and others to sense published and other types of materials without requiring the Braille format.

OBJECT OF THE INVENTION

It is a principal object of the present invention to teach the construction and operation of an optical display device capable of presenting a physical three dimensional representation of visual images on a light sensitive display.

Another object is to provide a tactile display device where upon contact with amplified laser light, individual elements are moved to form a pattern representing an observed visual image.

Another object is to provide a means to visually monitor manufacturing or other processes and events.

Another object is to provide a means for converting visual images into amplified laser light signals for presentation on a display device including on a three dimensional display device.

Another object is to provide a tactile display device that responds to amplified light signals and produces displacements proportional thereto in a display area.

Another object is to provide a tactile display unit with a means of storing the tactile representation of a visual image.

Another object is to enable the visually impaired to sense images or objects in the surrounding environment on a tactile display format.

These and other objects and advantages of the present invention will become apparent to those skilled in the art after considering the following detailed specification in conjunction with the accompanying drawings.

BRIEF DESCRIPTION OF THE DRAWINGS

FIG. 1 is a perspective view of one embodiment of an optical display device constructed according to the teachings of the present invention;

FIG. 2 is fragmentary exploded perspective view of a portion of the device of FIG. 1;

FIG. 3 is a schematic diagram of a portion of the light energy converting means;

FIG. 12 is a perspective view of one examination station of the present device used to make observations in an industrial application;

FIG. 13 is a perspective view of an embodiment used in an industrial application; and FIG. 14 is a perspective view of an embodiment used in an information reading application.

DETAILED DESCRIPTION OF THE INVENTION

Figure 4:
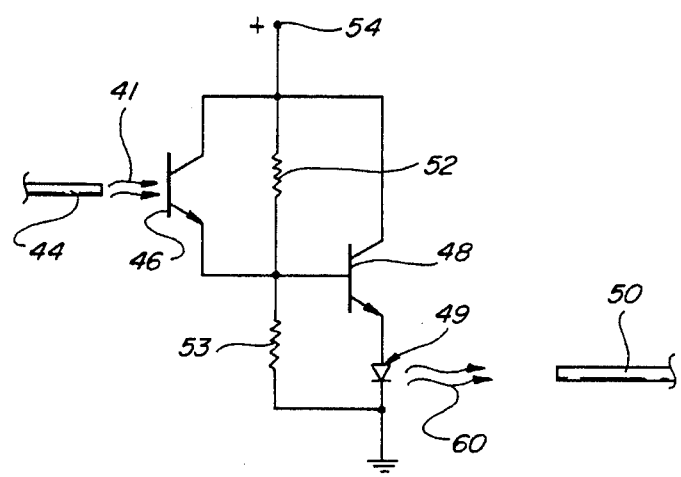
FIG. 4 is a schematic circuit diagram of one electrical energy converting means.

Referring to the drawings more particularly by reference numbers wherein like numerals refer to like parts, number 20 in FIG. 1 identifies one embodiment of an optical sensing and display device constructed according to the teachings of the present invention. The device 20 includes means for displaying images on a tactile or three dimensional display. The optical display device 20 includes a sensor or image input portion 22 which can be aimed or directed at an item or image 24 of interest to view or capture the image 24. The device also includes a display portion 25 which contains a means of converting the image 24 into a three dimensional or other representation such as star shaped image 26. The display portion 25 includes in the embodiment shown, a display panel 28 which may be constructed of a plurality of movable elements, the activated elements 27 being shown in a star shaped image 26 corresponding in shape and form to the shape and form of the image 24 being sensed or observed. A light sensitive element such as a photographic film can also be used to make a record. The optical display device 20 also can incorporate a transmission means 30 optically coupled to both the sensor 22 and the display portion 25. A transmission means 30 can transmit an image viewed with the sensor input portion 22 to the image conversion means incorporated in this embodiment in the display portion 25. Such transmission means preferrably includes fiber optic bundles which are especially appropriate for transmitting images therethrough. Such coherent fiber optic bundles are flexible, efficiently transmit light signals and have lower energy requirements when compared to other types of possible transmission means.

In the embodiment disclosed in FIG. 1, the tactile display panel 28 is disclosed as a sensible screen-like device similar in shape and size to a video monitor or such device. The three dimensional tactile image 26 produced by the displacement of the display elements 27 in the display portion 25 can be made proportional in intensity to the incoming signal. For example, darker portions of a captured visual image can be made to produce a different amount of element 27 deflection on the tactile display 28 than other lighter portions of the incoming signal or image. The overall spatial sensitivity or resolution and definition of the display portion 28 of the optical display device 20 can be modified through changing the number or size of the movable elements 27 to be included in the tactile or three dimensional display 28 and the corresponding optical fibers that activate said elements. The overall display sensitivity may also be affected by changing the material used in forming or coating the elements 27. Generally, the greater the number of movable display elements, with a correspondingly greater number of optical fiber transmission means and conversion means, the more detailed and sensitive can be an image represented on the tactile display 28.

FIG. 2 discloses another slightly more detailed representation of the embodiment 20 of the present optical display device. An image of a visible item 24 or location of interest is captured and transmitted as incoming sensory information signals through an optical means such as a plurality or set of input lenses 32 and 34 and an associated transmission means 30. The optical lenses can include a magnifying lens, a wide angle lens, a zoom lens, or other such optical devices. The incoming visual images are specifically focused onto the end face portion 31 of the transmission means 30, such as a flexible coherent optical fiber bundle, and transmitted therethrough. Importantly, where the input involves a complex image or input, each individual fiber comprising the optical fiber bundle receives and transmits only a portion of the total image observed instead of each fiber transmitting the total image. The individual fibers can be separated out of bundle form and individually optically coupled to a signal conversion means 36. Therefore the incoming visual images can be separated into individual portions and such individual portions can be converted in the conversion means 36 to laser light signals for subsequent activation of corresponding individual elements 27 in the representation 26. Optical fibers are normally formed from flexible strands of glass but other transparent or otherwise suitable materials for transmitting signals may be utilized. The flexibility of the fiber bundle in the transmission means 30 can allow an input or sensor portion containing the input lenses 32 and 34 to be "aimed" at an item 24 of interest while a person or device monitoring the corresponding three dimensional display can remain in another location or position. An input portion containing the lenses 32 and 34 may be controlled by hand or affixed in a more permanent manner, such as on head gear including helmets or spectacles, or by brackets to give a secured, directional view. Thus the person or device can physically detect an item or items of interest without coming into direct contact with the item or items. The conversion means 36 includes a plurality of photocircuits, each containing in part a photosensitive device such as a phototransistor, a transistor and a laser diode. These photocircuits, further detailed in FIGS. 3 and 4, amplify and convert individual portions of the incoming signals into corresponding amplified laser light signals. The amplified laser light signals produced by the conversion means 36 are transmitted through an output transmission means or fiber bundle 38 onto a tactile or other display device such as onto the display device 28. The number and location of individual fibers located in the transmission means 38 corresponds with the number and location of fibers in the transmission means 30, as well as the number of conversion circuits in the conversion means 36 and the display elements 27. These optic fibers are coupled to the display device 28 and oriented so as each transmit laser light signals onto single movable display elements 27.

A wavelength selective filter can also be incorporated into the input portion of the invention so that the device responds only to wavelengths of interest, such as in the infrared or ultraviolet regions of the spectrum, in order to monitor conditions related to temperature, stress and other flaws or conditions of an object whose thermal or other profile is being observed and/or recorded.

FIG. 3 discloses an embodiment of a single integrated photocircuit 40 located on a copper clad circuit board 42 where the conversion means of the present optical display device contains a plurality of such photocircuits. Each photocircuit importantly comprises one or more photosensitive devices 46, transistors 48 and laser diodes 49. The circuit is mounted on an electrically nonconductive substrate 45, where gold plated copper clad portions 43 and wire bonds 47 function as connectors. Optic fiber 44 such as from the fiber optic bundle 30 included in the input portion of the invention is separated from the other individual fibers and optically coupled to the circuit 40. The number of circuits 40 is equal to the number of the individual input or output optic fibers 44 and 50, respectively. A signal 41 is transmitted from the sensor input (not shown) through the input fiber 44 and onto a photosensitive device 46, such as a phototransistor having a collector 56 and an emitter 57. The electrical signal produced by the photosensitive device 46 is fed into a transistor 48 having a collector 59, an emitter 61 and a base 62, which powers the laser diode 49. The laser diode 49 produces a high intensity coherent laser light signal 60 for transmission through an output optic fiber 50 optically coupled with the laser diode 49 and onto a three dimensional or tactile display device or other laser light sensitive device (not shown in FIG. 3). A series of bias resistors, shown as 52 and 53 in FIG. 4, are selected so that the voltage supplied to the laser diode 49 is biased above that needed by the laser diode to initiate lasing. The biased laser diode circuit avoids the nonlinear response normally associated with the initial activation of a laser diode and allows for operation as a linear system. The amplified laser signal increases the sensitivity of the present device and reduces the amount of distortion in the tactile or other display. Even minor changes in the input signal can produce significant detectable changes in the output signals by many orders of magnitude.

The electronic circuit in FIG. 3 is further detailed in the schematic circuit diagram disclosed in FIG. 4. Each individual optical fiber 44 is optically coupled to a single photosensitive device 46, such as to the NPN phototransistor, one phototransistor being associated with each optical fiber. The input signals 41 received from the image input varies the phototransistor electrical output fed into the transistor 48, subsequently powering the laser diode 49. The laser diode 49 emits an amplified laser light signal 60 through a separate output optical fiber 50 relative to the original input signal 41. A voltage source 54 provides bias through the resistors 52 and 53 to the transistor 48 and to the laser diode 49 above the lasing threshold of the laser diode so that additional output from the phototransistor 46 produces the linear amplified coherent laser light signal 60.

Figure 5:
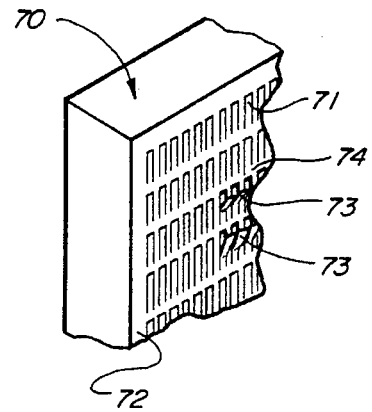
FIG. 5 is a fragmentary perspective view of one embodiment of the three dimensional tactile display device for use with the present invention.

FIG. 5 discloses a portion of one embodiment of a three dimensional or tactile screen-type display device 70 containing a plurality of movable elements 71. Three-sided windows or flaps may be cut or formed with mechanical means or preferably by laser to form the elements 71 from a light sensitive material such as a bimetallic membrane 72. In addition, the material can be coated with a light absorbing optical coating on the side face portion oriented towards the laser light signals. The individual output optic fibers of the present device are oriented towards and optically coupled with respective elements 71 of the display 70 so as to shine directly on a surface of a single corresponding movable display element flap such as a flap 73. The tactile display will be flat when no image is observed by the image input portion of the present device. However, when an image is received by an input sensor (not shown), the resulting amplified laser light signal contacts the corresponding element of the tactile display, such as the flap 73, which heats up and rises or moves detectably outward from the plane of the remaining flat membrane display surface 74. The elements or flaps 71 are of sufficient length so that this flap movement forms a physical three dimensional pattern representative of the various images the optical display device is sensing, the pattern being detectable in some way, such as through one's sense of touch or by a suitable detector or switch device.

The optic fibers are properly maintained in a coherent orientation corresponding to the fiber orientation incorporated in the image sensing portion of the present device so that a resulting displayed tactile image is a directionally accurate representation and not a scrambled image. The preferred sensitivity and definition of the tactile display quite often will depend on the intended application. The amount of displacement of the various display elements 71 may be made proportional to the strength of the incoming signals which can provide a more accurate three dimensional representation of the image or alternatively help sense additional information from the tactile image such as image intensity or other such nuances. An adequate representation of an observed image sufficient for tactile recognition by a device or a person feeling the display, also can be controlled by various factors including the number, size and arrangement of the elements in the tactile display.

Figure 6:
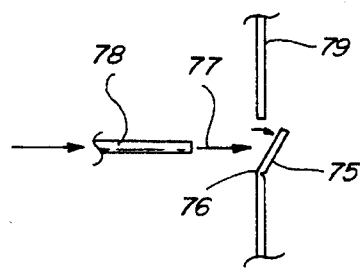
FIG. 6 is a fragmentary side elevational view of one element of the three dimensional tactile display of FIG. 5.

The window or flap type element 71 disclosed in FIG. 5 which respond to laser light signals through a deflection motion, is further disclosed in FIG. 6. The single element flap 75 shown, deflects at point 76 to form a portion of a display when a laser light signal 77 exits an output optic fiber 78 and contacts a surface portion of element flap 75. When the laser signal 77 is interrupted and returns to a minimal base line emission corresponding to when there is no incoming visual signal, the flap-like element 75 cools and returns to a position at or near the plane of the rest of the tactile display body 79.

Figure 7:
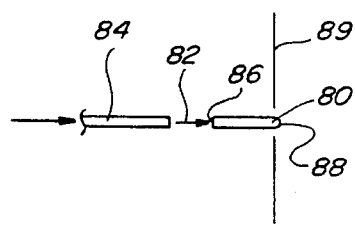
FIG. 7 is a fragmentary side elevational view of another embodiment of an element of the tactile display device in accordance with the present invention.

FIG. 7 shows another embodiment of a tactile display element 80 of the present invention which responds to a laser light signal by elongating and not by deflection. The movable element 80 can be formed from the same material as the optical fibers but doped or coated with a light sensitive material. Upon exposure to a laser light emission 82, the element 80 expands through a thermal lensing process to produce a portion of a tactile representation, such as of an observed object. The element 80 is located in the display and is optically coupled or aligned with an optic fiber 84 so that when the laser light 82 is transmitted from the fiber 84, the laser light emission impinges on the treated element end 86 and the doped fiber element 80 will expand lengthwise due to thermal lensing. A tip 88 of the element 80 will then extend out from the surface or plane 89 of the stationary display surface where it can be sensed. When the laser emission 82 terminates, the element 80 will cool and retract to its deactivated state and the tip 88 will revert to a position in the plane of the surface 89.

Figure 8:
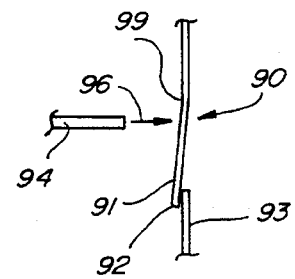
FIG. 8 is a fragmentary side elevational view of an element of an embodiment of the tactile display device in an unactivated position.
Figure 9:
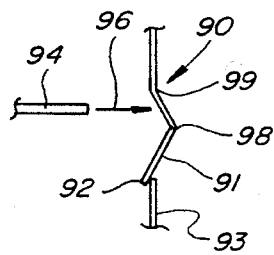
FIG. 9 is a fragmentary side elevational view of an element of the tactile display device in an activated protruding position.

FIGS. 8 and 9 disclose a third embodiment of an element 90 useful for forming a three dimensional display. The element 90 can be a bimetallic membrane as discussed previously where flap-like portion 91 is cut or formed from the light sensitive membrane and coated with a light absorbing treatment. A free end 92 of flap 91 overlaps a static portion 93 of the display membrane. On exposure to laser light 96 from optic fiber 94, the flap 91 heats up, expands upward and bends at weakened points 98 and 99 to form a protuberance that extends out from the normal plane of the display. The free end 92 of flap 91 remains in contact with stationary portion 93 so that when laser light signal 96 ceases, the flap 91 will return to its initial de-energized position approximately in the plane of the display.

Figure 10:
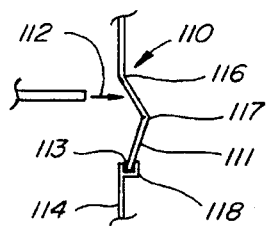
FIG. 10 is a fragmentary side elevational view of an embodiment of the present invention where a display element is in a semi-permanent retained position.

Another alternative embodiment is disclosed in FIG. 10 where an element flap 111 is formed so that upon excitation with laser light 112, the element flap 111 bends at weakened places 116 and 117, and in so doing contracts sufficiently so that flap end 113 moves out of engagement with the backside of a stationary display portion 114 and lodges in a catch 118. The flap 111 is therefore retained in a detectable constricted position that is able to be sensed by touch or by a sensor device after the laser light signal has stopped. The flap 111 can be returned to its initial unexcited position by a clearing motion performed on the flaps, such as by pressing a finger or hand against the flap 111.

Figure 11:
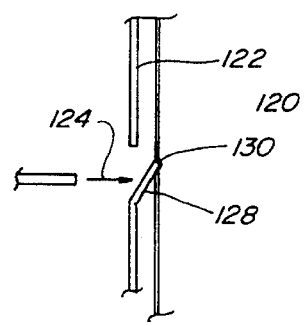
FIG. 11 is a fragmentary side elevational view of an embodiment of the present invention where display panel element forms a permanent record thereof.

A means of forming and maintaining a permanent record of a three dimensional tactile display by incorporating touch-sensitive means in contact with the tactile display is disclosed in FIG. 11. The previously described embodiments of a tactile display device can also be used to imprint displayed images onto other surfaces, including a touch or pressure sensitive means 120, to permanently record a displayed image. The pressure sensitive means 120, such as a pressure sensitive paper, can be placed and maintained close or even in contact with the facing surface 122 of a tactile display where the display elements 128 move when excited. When a laser light emission 124 contacts and activates the element flap 128, the flap 128 deflects and a portion of the flap end 130 contacts and marks the pressure sensitive means 120 thereby forming a permanent record of where the flap touches it. The combination of all such activated elements on the display forms a permanent record of the displayed image which can be used for record keeping and so forth. Alternatively, a permanent record of an image may be achieved by substituting a light sensitive film for the tactile display elements so that the laser light signals directly impinge on the light sensitive film to form a removable image-containing record.

FIG. 12 discloses an embodiment of the present optical display device for use in an industrial application such as for detecting the uniformity of pieces. Here, an optical display device 140 can be directed at work pieces 142 located on a moving belt 144. The pieces 142 are to have a plurality of openings 146 bored in them, the correct number in this application being three. A series of sensors or image input portions 148 are anchored in a fixed orientation by a plurality of restraining arms 150 and 152 such that the input portions 148 are located to align with the bore locations 146 on the pieces 142. The optical images of the openings 146 are transferred through transmission means or optical fiber bundles 154 into a corresponding number of tactile displays 156. Alternatively, a single display could be utilized to display images from a plurality of bundles. Further embodiments may involve means where a portion of the transmission means is separated to form a plurality of input sensors and then subsequently are combined back and reformed into a bundle to display on a single device. As soon as a piece 142 with an incorrect number of openings 146 or opening configurations comes into view, an operator or a sensor device can note or identify the defective work piece.

Still another embodiment 180 is disclosed in FIG. 13, where the display is designed to operate as a gauge for monitoring various levels, such as fluid levels. Fluids are commonly stored or retained in reservoirs, storage tanks or other such containers which frequently are made of opaque materials, such as metal, plastic or fiberglass. Such devices use dip sticks or floats to indicate the level of the fluids contained therein. With the embodiment 180, an input portion 182 is focused on a sight glass or refractory 184 mounted in an opening on container 186 to observe the fluid level 188. A simple display device 192 with a reduced number of elements or flaps 194 can be incorporated with a control device 196 so as to actuate an independent automatic filling or pumping device. For example, when the fluid level reaches a certain point, affecting the position of the elements 194 on the tactile display device 192, corresponding cooperatively engaged contacts 198 of switches can be engaged to send a response such as on lead 199 to a microprocessor or other control device, thus beginning the fluid control procedure required. In addition, a related embodiment incorporating a row of narrow optical fibers can be used to precisely monitor and control such things as fluid levels in chemical and medical applications to within a range of about ten to one hundred microns, assuming a corresponding range of fiber diameters.

An embodiment of the present invention relating to a reading aid for the visually impaired is disclosed in FIG. 14. Positioning an input sensor 202 of a reading aid 200 towards printed material or the like, such as sign 204, can produce a sensible display 206 in a non-visual readable manner. Applying the present invention to this type of application, including involving publications incorporating small type such as newspapers or magazines, a tactile display can be produced. In this way a number of movable display elements 208 can be used as required to give an adequate definition to the alphanumeric characters or other such indicia. Such a device also could be directed towards information contained on a computer monitor or other such display so as to permit a readable tactile display of the computer generated information.

As explained above the present invention can be used to produce many different kinds of displays including tactile displays where individual fibers control and move corresponding individual elements in a display panel. The outputs can also be used to produce images on a film such as on a photographic film which can be developed later and used for some purpose. The device can also be used as an aid to the blind or visually impaired to provide them with means to observe their surroundings for safety and other reasons, and the device can be used to monitor substances such as the level of fluid in a container as well as other environmental and related conditions such as for example pressure, temperature and humidity. All of these things can be done by a device that is relatively inexpensive Considering that laser diodes are now state-of-the-art, and they can be done in a device that can be made to be relatively compact and easy to handle and carry. The device has many applications including applications on moveable objects such as on airplanes and automobiles where it may be used to sense the presence of oncoming objects such as other vehicles or airplanes. The present invention therefore is a pioneering type invention which opens a new way of observing objects in a field of view and of using the observed information to produce a tactile, photographic or other representation thereof for some purpose.

Thus, there has been shown and described a novel optical display device which fulfills all of the objects and advantages sought therefor. Many changes, modifications, variations and other uses and applications of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A display device for displaying images comprising:

an image sensor having at least one opening adapted to be directed at a scene in which images are to be viewed, said image sensor including a plurality of optical fibers, one end of each fiber being positioned adjacent the opening so as to receive non-coherent light from a distinct portion of the scene being viewed, each fiber having an opposite end, a plurality of signal amplifying means, each amplifying means optically coupled respectively to the opposite end of one of the optical fibers, each amplifying means including a photosensitive receptor having an input portion in optical communication with the opposite end of the respective optical fiber and producing an electric output in response to the non-coherent light, each amplifying means including a corresponding coherent laser light generating means in communication with the electrical output of one corresponding photosensitive receptor, each of the coherent laser light generating means emitting coherent laser light in response to the electrical output from the corresponding photosensitive receptor, and a display having a light sensitive film in optical communication with each of the coherent laser light generating means, respective portions of said light sensitive film responding to coherent laser light from the respective ones of the coherent laser light generating means to produce a corresponding detectable change therein.

2. A display device for displaying images comprising:

an image sensor having at least one opening adapted to be directed at a scene in which images are to be viewed so that the opening receives non-coherent light therefrom, a plurality of optical fibers, one end of each optical fiber associated with the image sensor opening such that non-coherent light enters therein, the plurality of optical fibers arranged such that each optical fiber receives non-coherent light from a distinct portion of the scene.

a plurality of conversion circuits, each conversion circuit optically coupled to one of the optical fibers so as to receive non-coherent light therefrom, each conversion circuit including a light sensitive element which produces an electrical signal in response to the received non-coherent light, a plurality of laser diodes, each laser diode associated with one of the conversion circuits and responsive to the associated electrical signal to generate a corresponding coherent laser light signal, and a display portion having a plurality of members thereon, each member in optical communication with one of the laser diodes so that the corresponding coherent laser light signal output therefrom heats the member and thereby produces a recognizable movement of the member, the plurality of members arranged such that movement of each member in response to the corresponding coherent laser light signal results in a change in the display which represents the scene viewed by the image sensor.

3. The display device of claim 2 wherein the plurality of laser diodes are coupled to the display portion by a second plurality of optical fibers, one end of each fiber of the second plurality positioned to receive the corresponding coherent laser light signal from one corresponding laser diode, the opposite end of each fiber of the second plurality positioned adjacent the display device.

4. The display device of claim 3 wherein each of the conversion circuits comprises a plurality of transistors, at least one transistor comprising a phototransistor which is the light sensitive element, at least one other transistor arranged to amplify the electrical signal produced by the phototransistor.

5. The display device of claim 2 wherein the image sensor includes a wavelength selective filter.

6. A display device having a plurality of distinct display areas in optical communication with respective ones of a plurality of coherent laser light generating means so that coherent laser light signals output from the generating means produce recognizable movement of the corresponding respective distinct display areas, each coherent laser light generating means associated with a respective light controlled circuit such that each coherent laser light generating means is energized in response to non-coherent light impinging on at least a portion of the corresponding circuit.

7. The device of claim 6 wherein the display areas include a bimetallic sheet having a plurality of elements formed therein.

8. The device of claim 6 wherein the recognizable changes in the display areas are proportional to the intensity of the coherent laser light impinging thereon.

9. The device of claim 6 including pressure sensitive means positioned in close proximity to the distinct display areas so that movement of the distinct display areas produce corresponding changes in the pressure sensitive means.

10. A display device having a plurality of distinct display areas in optical communication with respective ones of a plurality of coherent laser light generating means and means to energize related ones of the coherent laser light generating means in response to receipt of non-coherent light to produce recognizable changes in the corresponding respective distinct display areas, the display areas including a bimetallic sheet having a plurality of elements formed therein, the elements having a light absorbing optical coating.

11. The device of claim 10 wherein the elements are maintained in a deactivated protruding position.

12. A device for producing highly amplified coherent laser light signals corresponding to portions of a visual image including an image sensor having a plurality of optical fibers, one end of each fiber being positioned to view a portion of a scene to be viewed such that each fiber end receives non-coherent light from a distinct portion of the scene, a plurality of optical amplifying means, each optical amplifying means in communication with the opposite end of one respective optical fiber and including a photosensitive receptor having an input portion in optical communication with the respective optical fiber and producing an electrical output, and a plurality of coherent laser light generating means, each coherent laser light generating means having an input in communication with the electrical output of one respective amplifying means.

13. The device for producing amplified coherent laser light signals of claim 12 wherein each of the coherent laser light generating means comprises a laser diode which is biased to maintain the laser diode at a lasing base level.

* * * * *

UNITED STATES PATENT AND TRADEMARK OFFICE
CERTIFICATE OF CORRECTION

PATENT NO. : 5,574,576
DATED : November 12, 1996
INVENTOR(S) : Danny W. Martin

It is certified that error appears in the above-indentified patent and that said Letters Patent is hereby corrected as shown below:

Column 1, line 33, "to" should be --do--.
Column 10, line 5, "Considering" should be --considering--.
Column 10, line 65, "scene." should be --scene,--.

Signed and Sealed this

Twenty-second Day of April, 1997

Attest:

BRUCE LEHMAN

*Commissioner of Patents and Trademarks*

*Attesting Officer*